United States Patent
DeCesaris et al.

(10) Patent No.: US 8,954,634 B2
(45) Date of Patent: Feb. 10, 2015

(54) OPERATING A DEMULTIPLEXER ON AN INTER-INTEGRATED CIRCUIT ('I2C') BUS

(75) Inventors: Michael DeCesaris, Carrboro, NC (US); Steven C. Jacobson, Mebane, NC (US); Luke D. Remis, Raleigh, NC (US); Gregory D. Sellman, Morrisville, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 369 days.

(21) Appl. No.: 13/530,245

(22) Filed: Jun. 22, 2012

(65) Prior Publication Data

US 2013/0343197 A1  Dec. 26, 2013

(51) Int. Cl.
*G06F 3/00*    (2006.01)
(52) U.S. Cl.
USPC ............................................... 710/51; 710/15
(58) Field of Classification Search
None
See application file for complete search history.

(56) References Cited

U.S. PATENT DOCUMENTS

| | | |
|---|---|---|
| 5,272,725 A | 12/1993 | Jones et al. |
| 6,321,366 B1 | 11/2001 | Tseng et al. |
| 7,417,576 B2 | 8/2008 | Prestros |
| 2011/0194595 A1 | 8/2011 | Shetty |
| 2013/0343197 A1 | 12/2013 | DeCesaris et al. |
| 2013/0346658 A1 | 12/2013 | Decesaris et al. |
| 2013/0346763 A1 | 12/2013 | DeCesaris et al. |
| 2013/0346835 A1 | 12/2013 | DeCesaris et al. |

*Primary Examiner* — Cheng-Yuan Tseng
(74) *Attorney, Agent, or Firm* — Edward J. Lenart; Katherine S. Brown; Biggers Kennedy Lenart Spraggins LLP (57) ABSTRACT

Operating a demultiplexer on an I²C bus, the demultiplexer including a set of input signal lines from an I²C master and a plurality of sets of output signal lines, the demultiplexer configured to couple the inputs among the output in dependence upon a demultiplexer select signal line that couples the demultiplexer to a rise time detection circuit, where the rise time detection circuit is also coupled to the input signal lines and the rise time detection circuit: monitors a voltage of at least one of the input signal lines, including: receiving, from the I²C master, a signal on one of the lines; and detecting rise time of the signal; and if the rise time of the signal is less than a predefined threshold, configuring the demultiplexer to vary the coupling of the input signal lines from a first set of outputs to a second set.

19 Claims, 4 Drawing Sheets

OPERATING A DEMULTIPLEXER ON AN INTER-INTEGRATED CIRCUIT ('I2C') BUS

BACKGROUND OF THE INVENTION

1. Field of the Invention

The field of the invention is data processing, or, more specifically, methods, apparatus, and products for operating a demultiplexer on an Inter-Integrated Circuit ('I2C') bus.

2. Description of Related Art

The Inter-Integrated Circuit ('I²C') data communications interface and protocol is used widely throughout computing and electronic systems for various reasons including the robustness and stability of the protocol. The protocol, however, does have a few limitations. The protocol is generally implemented with a master device and one or more slave devices. Each slave device is generally provided a unique address for use in communication on the I²C bus. Demultiplexers which aid in the distribution of the I²C bus to multiple slave devices, generally also function as a slave device, requiring a separate unique address. As computer systems become more complex, more I²C slaves are added, more demultiplexers are added, and many addresses are utilized in I²C bus systems. Being a serial data communications protocol, a finite number of addresses exist until additional bits are utilized. Such additional bits, however, reduce the effective bandwidth of such a bus.

SUMMARY OF THE INVENTION

Methods, apparatus, and products for operating a demultiplexer on an Inter-Integrated Circuit ('I²C') bus without addressing the demultiplexer are disclosed in this specification. The demultiplexer includes a set of input signal lines from an I²C master and a plurality of sets of output signal lines. The demultiplexer is configured to couple the input signal lines among the sets of output signal lines in dependence upon a demultiplexer select signal line. The demultiplexer select signal line couples the demultiplexer to a rise time detection circuit. The rise time detection circuit is also coupled to the input signal lines from the I²C master. In embodiments of the present invention, operating the demultiplexer includes determining, by the I²C master, whether to configure the demultiplexer to vary the coupling of input signal lines from a first set of output signal lines to a second set of output signal lines. If the I²C master determines to configure the demultiplexer to vary the coupling: the I²C master transmits, to the rise time detection circuit and the demultiplexer, a signal on one of the input signal lines. In transmitting the signal, the I²C master drives the signal to a logic high with an active driver, where the signal includes a rise time less than a predefined threshold. If the I²C master determines not to configure the demultiplexer to vary the coupling, the I²C master transmits, to the rise time detection circuit and the demultiplexer, a signal on one of the input signal lines where the I²C master drives the signal to a logic high passively and the signal includes a rise time not less than the predefined threshold.

The rise time detection circuit is configured to monitor a voltage of at least one of the input signal lines, where the voltage alternates between a logic low voltage and a logic high voltage. In monitoring the voltage, the rise time detection circuit receives, from the I²C master, a signal on one of the input signal lines and detects rise time of the signal. If the rise time of the signal is less than a predefined threshold, the rise time detection circuit configures the demultiplexer to vary the coupling of the input signal lines from a first set of output signal lines to a second set of output signal lines.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
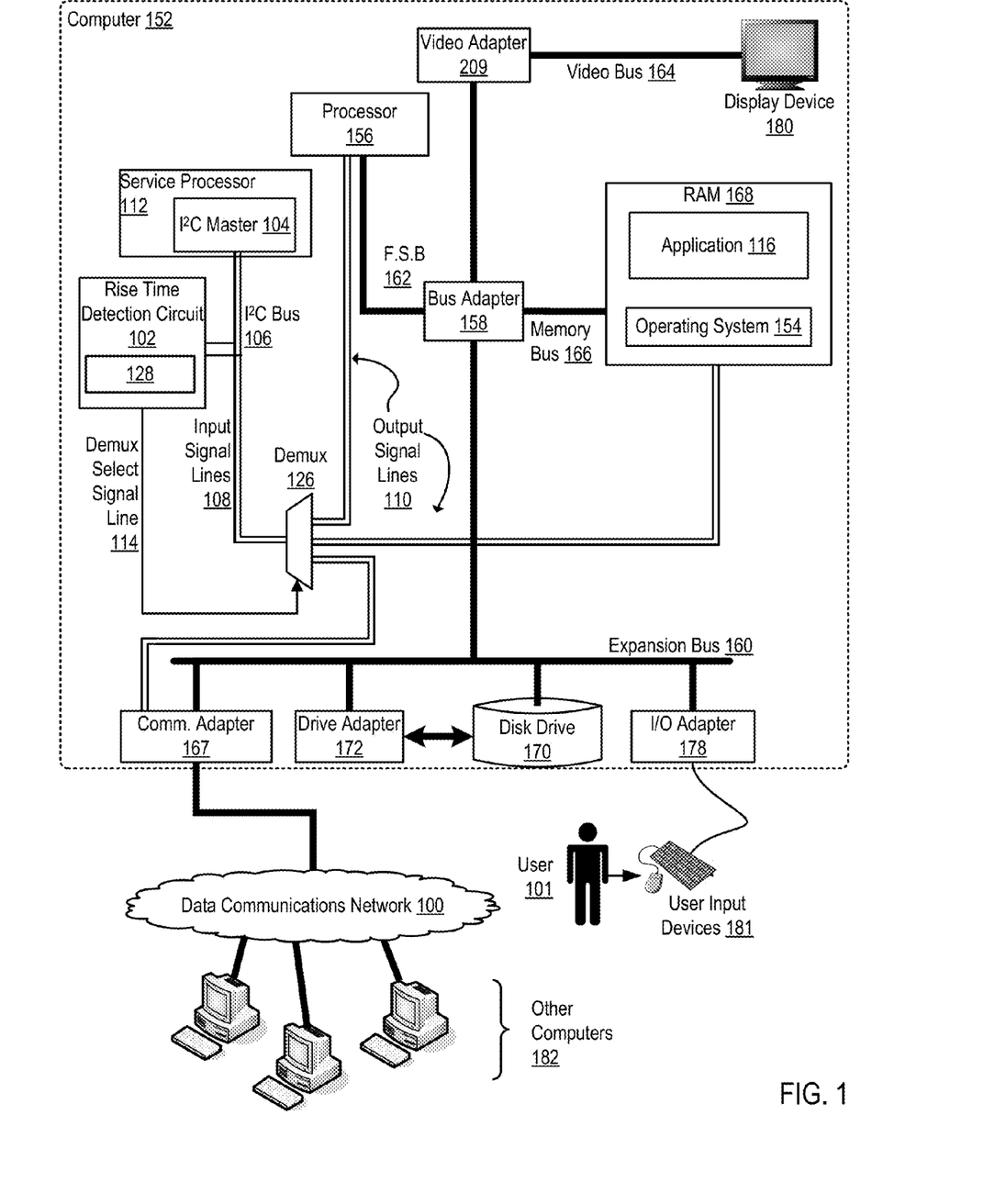
FIG. 1 sets forth a block diagram of an example system for operating a demultiplexer on an I²C bus according to embodiments of the present invention.

Exemplary methods, apparatus, and products for operating a demultiplexer on an Inter-Integrated Circuit ('I²C') bus in accordance with the present invention are described with reference to the accompanying drawings, beginning with FIG. 1. FIG. 1 sets forth a block diagram of an example system for operating a demultiplexer on an I²C bus according to embodiments of the present invention. The system of FIG. 1 includes automated computing machinery comprising an exemplary computer (152) useful in operating a demultiplexer on an I²C bus according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application (116), a module of computer program instructions for carrying out user-level data processing tasks. Examples of such applications include word processing applications, spreadsheet applications, multimedia library and playback applications, presentation applications, database applications, and so on. Also stored in RAM (168) is an operating system (154). Operating systems useful for operating a demultiplexer on an I²C bus according to embodiments of the present invention include UNIX™, Linux™, Microsoft XP™, Windows 7™, AIX™, IBM's i5/OS™, and others as will occur to those of skill in the art. The operating system (154) and application (116) in the example of FIG. 1 are shown in RAM (168), but many components of such software typically are stored in non-volatile memory also, such as, for example, on a disk drive (170).

The computer (152) in the example of FIG. 1 also includes a service processor (112). A service processor as the term is used in this specification refers to a processor, field programmable gate array ('FPGA'), application specific integrated circuit ('ASIC') microcontroller, or the like, distinct from the main CPU (156), which manages platform-specific functions. Examples of such management include monitoring environmental conditions, handling certain error conditions, and otherwise communicating out-of-band with components of the computer (152). A service processor may include Read Only Memory ('ROM'), RAM, Electrically Erasable Programmable ROM ('EEPROM'), or other memory that includes computer program instructions executable by a processing core of the service processor (112).

In the example of FIG. 1, the service processor (112) communicates with components of the computer (152) through an out-of-band I²C bus (106). An I²C bus is a multi-master serial single-ended computer bus that is typically used to attach low-speed peripherals to a motherboard, embedded system, mobile communications device, serial processor, or other electronic device. The service processor (112) in the example of FIG. 1 is configured as an I²C master (104), while other peripherals, such as the communications adapter (167), RAM (168), and processor (156) are configured as I²C slaves. Another I²C slave in the example of FIG. 1 includes a demultiplexer (126)

The demultiplexer (126) in the example of FIG. 1 includes a set of input signal lines from the I²C master (104). I²C generally utilizes a two-wire bus, one wire comprising a serial data line ('SDL') and other wire comprising a serial clock line ('SCL'). The demultiplexer (126) also includes a plurality of sets of output signal lines (110). The demultiplexer (126) in the example of FIG. 1 is configured to couple the input signal lines among the sets of output signal lines (110) in dependence upon a demultiplexer select signal line (114). Effectively, the demultiplexer operates as a switch that couples the input (SDL and SCL) to one of the demultiplexer's outputs. The demultiplexer select signal line (114) controls which output the demultiplexer will couple to the input signal lines (108). The demultiplexer select signal line (114) couples the demultiplexer (126) in the example of FIG. 1 to a rise time detection circuit (128). The rise time detection circuit (128) is also coupled to the input signal lines (108) from the I²C master (104).

The I²C master (104) in the example of FIG. 1 may include executable computer program instructions, or otherwise be configured to operate the demultiplexer (126) in accordance with embodiments of the present invention by determining whether to configure the demultiplexer to vary the coupling of input signal lines from a first set of output signal lines to a second set of output signal lines (110). Such a determination may be based on the desired destination of a data transmission, the I²C slave to which a data signal is to be transmitted. If the I²C master determines to configure the demultiplexer to vary the coupling, the I²C master (104) transmits, to the rise time detection circuit (102) and the demultiplexer (108), a signal on one of the input signal lines (108) where the I²C master (104) drives the signal to a logic high with an active driver and the signal includes a rise time less than a predefined threshold (128).

If, however, the I²C master (104) determines not to configure the demultiplexer (126) to vary the coupling, the I²C master transmits, to the rise time detection circuit (102) and the demultiplexer (126), a signal on one of the input signal lines (108) where the I²C master (104) drives the signal to a logic high passively and the signal includes a rise time not less than the predefined threshold (128).

The rise time detection circuit (102) in the example of FIG. 1 may be any processor, service processor, microcontroller, ASIC, FPGA, or other logic configured to monitor a voltage of at least one of the input signal lines (108) where the voltage alternates between a logic low voltage and a logic high voltage. While monitoring the voltage, the rise time detection circuit (102) in the example of FIG. 1 may receive, from the I²C master, a signal on one of the input signal lines (108) detect rise time of the signal. If the rise time of the signal is less than a predefined threshold (128), the rise time detection circuit (102) may configure the demultiplexer (126) to vary the coupling of the input signal lines from a first set of output signal lines to a second set of output signal lines. In this way, the operation of the demultiplexer on the I²C bus (106) may be controlled through variations of rise time of a signal on one of the input signal lines (108) without separately addressing the demultiplexer (126).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for operating a demultiplexer on an I²C bus according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for operating a demultiplexer on an I²C bus according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
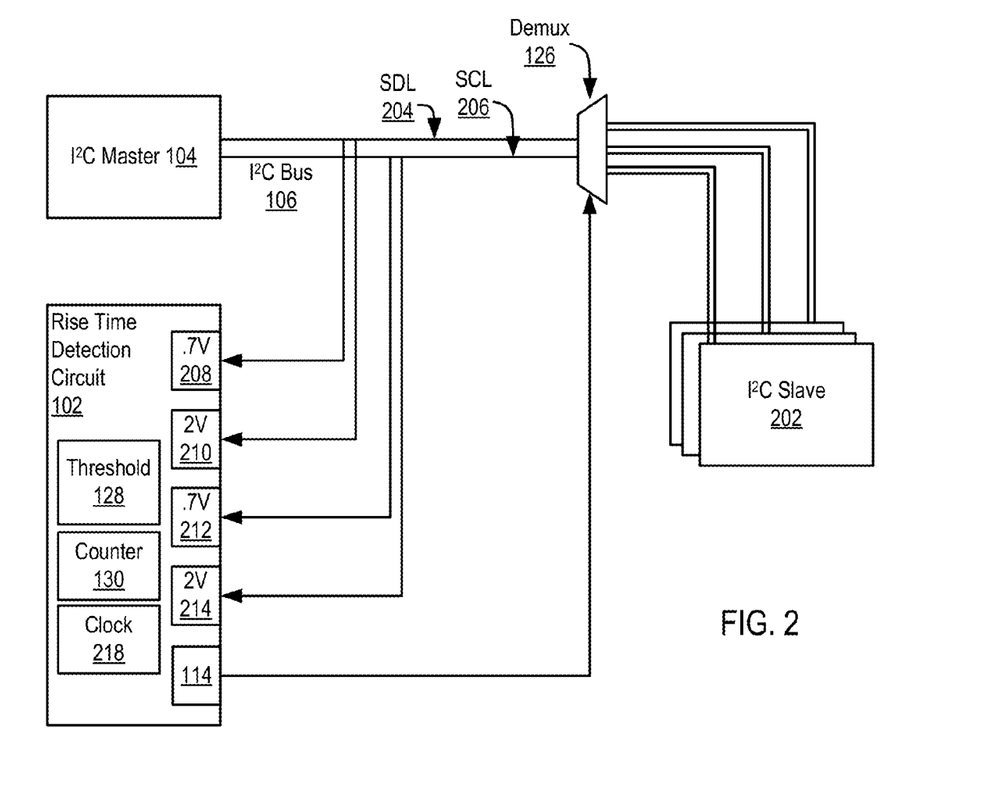
FIG. 2 sets forth a block diagram of another exemplary system for operating a demultiplexer on an I²C bus according to embodiments of the present invention FIG. 3 sets forth an example signal timing diagram illustrating the signals in the example system of FIG. 2.

For further explanation, FIG. 2 sets forth a block diagram of another exemplary system for operating a demultiplexer on an I²C bus according to embodiments of the present invention. The system of FIG. 2 includes an I²C master (104), a plurality of I²C slaves (202), a demultiplexer (126), and a rise time detection circuit (102). The master (104) is coupled for data communications to the slaves (202) by an I²C bus (106) and the demultiplexer (126). The bus (106) includes a plurality of signal lines, including in this example a serial clock line ('SCL') (206) and a serial data line ('SDL') (204). At least one of the signal lines is coupled to the rise time detection circuit (102). In this example, the SDL (204) and SCL (206) are both coupled to the rise time detection circuit (102). The rise time detection circuit is configured to monitor a voltage of each signal line (204, 206). The voltage alternates between a logic low voltage (such as 0V) and a logic high voltage (such as 3.3V).

The I²C master (104) in the example of FIG. 2 may determine whether to configure the demultiplexer to vary the coupling of input signal lines (204, 206) from a first set of output signal lines to a second set of output signal lines. If the I²C master determines to configure the demultiplexer to vary the coupling, the I²C master transmits, to the rise time detection circuit (102) and the demultiplexer (126), a signal on one of the input signal lines where the signal is driven to a logic high with an active driver and has a rise time less than a predefined threshold. If the I²C master determines not to configure the demultiplexer to vary the coupling, the I²C master transmits, to the rise time detection circuit (102) and the demultiplexer (126), a signal on one of the input signal lines (204, 206) where the signal is driven to a logic high passively and the signal has a rise time not less than the predefined threshold.

The rise time detection circuit (102) receives the signal transmitted by the I²C master (104) either one the SDL (204) or the SCL (206). The rise time detection circuit detects a first voltage on one of the signal lines, where the first voltage is greater than the logic low voltage. The first voltage, for example, may be implemented as 0.7V. In the example of FIG. 2, the rise time detection circuit (102) includes two inputs (208, 210, 212, 214) for each signal line. For each signal line, one input (208, 212) is configured to detect the first voltage (in this example, 0.7V) and another input is configured to detect a second voltage (in this example, 2V).

Responsive to the detection of the first voltage, the rise time detection circuit (102) starts an automatically incrementing counter (130). The counter increments once for each clock (218) period of the rise time detection circuit (102). The period of the clock (218) of the rise time detection circuit (102) is less than the rise time of the I²C signal line.

The rise time detection circuit (102) then detects a second voltage (2V in this example) on the signal line (204 or 206). The second voltage is greater than the first voltage and less than the logic high voltage. Responsive to the detection of the second voltage, the rise time detection circuit (102) stops the automatically incrementing counter (130).

The rise time detection circuit (102) then calculates, in dependence upon the clock period of the rise time detection circuit and the value of the counter, a rise time for the signal line. The rise time detection circuit (102) may calculate such a rise time by calculating the product of the clock (218) period of the rise time detection circuit (102) and the value of the counter.

The rise time detection circuit (102) then determines whether the calculated rise time is less than a predetermined maximum threshold (128). If the rise time of the signal is less than a predefined threshold, the rise time detection circuit (112) configures the demultiplexer to vary the coupling of the input signal lines from a first set of output signal lines to a second set of output signal lines. The rise time detection circuit (112) may configure the demultiplexer to vary the coupling by transmitting a signal to the demultiplexer via the demultiplexer select signal line (114), incrementing the selected output of the demultiplexer to a subsequent output.

Figure 3:
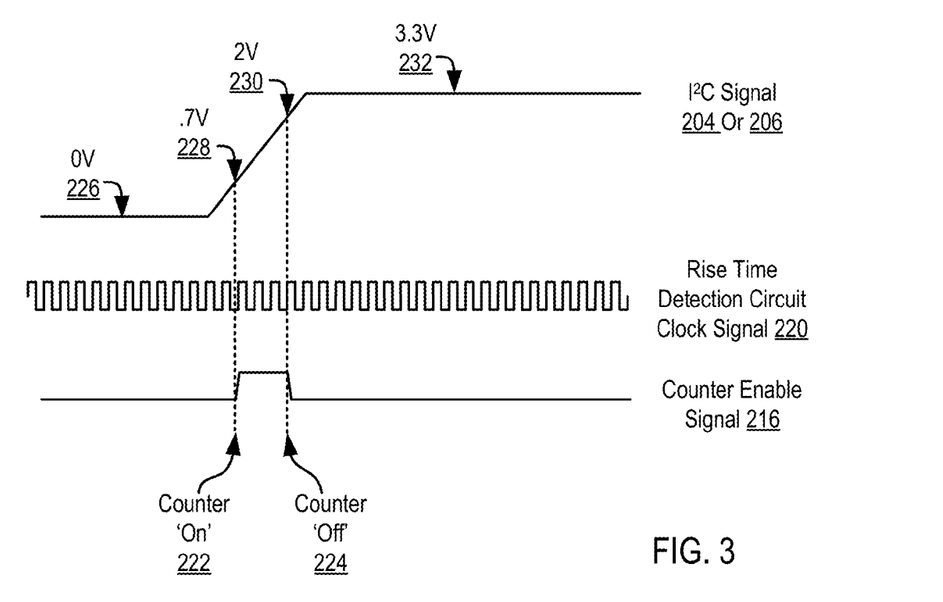

For further explanation, FIG. 3 sets forth an example signal timing diagram illustrating the signals in the example system of FIG. 2. The example timing diagram of FIG. 3 includes an I²C signal, either SDL (204) or SCL (206), the clock signal (220) of the clock (218 of FIG. 2) in the rise time detection circuit (102) and an enable signal for the automatically incrementing counter (216).

In the example of FIG. 3, as the I²C signal (204, 206) rises, the rise time detection circuit (102) detects a first voltage (228) of 0.7V on the signal line. Responsive to the detection of the first voltage (228), the rise time detection circuit (102) starts (222) an automatically incrementing counter (130) through use of the enable signal (216). The counter increments once for each clock signal (220) period of the rise time detection circuit (102).

As the I²C signal (204, 206) continues to rise, the rise time detection circuit (102) detects a second voltage (230) of 2V on the signal line. Responsive to the detection of the second voltage (230), the rise time detection circuit (102) stops (224) the automatically incrementing counter, again through use of the counter enable signal (216).

The rise time detection circuit (102) then calculates a rise time for the signal line (204, 206) in dependence upon the period of the clock signal (228) and the value of the counter. In the example of FIG. 3, three periods of the rise time detection circuit clock signal (220) elapse during the time in which the counter is automatically incrementing. That is, the value of the counter is three. Consider, as an example, that the period of the clock signal is 10 nanoseconds (ns). In such an example, the rise time detection circuit may calculate a rise time of 30 ns (the counter value of 3 multiplied by 10 nanoseconds per clock period).

The rise time detection circuit (102) then determines whether the calculated rise time is less than a predefined threshold. If the calculated rise time is less than the predefined threshold, the rise time detection circuit (102), through demultiplexer select signal line (114), varies the coupling between demultiplexer input and outputs from a first set of outputs to a second set of outputs.

Figure 4:
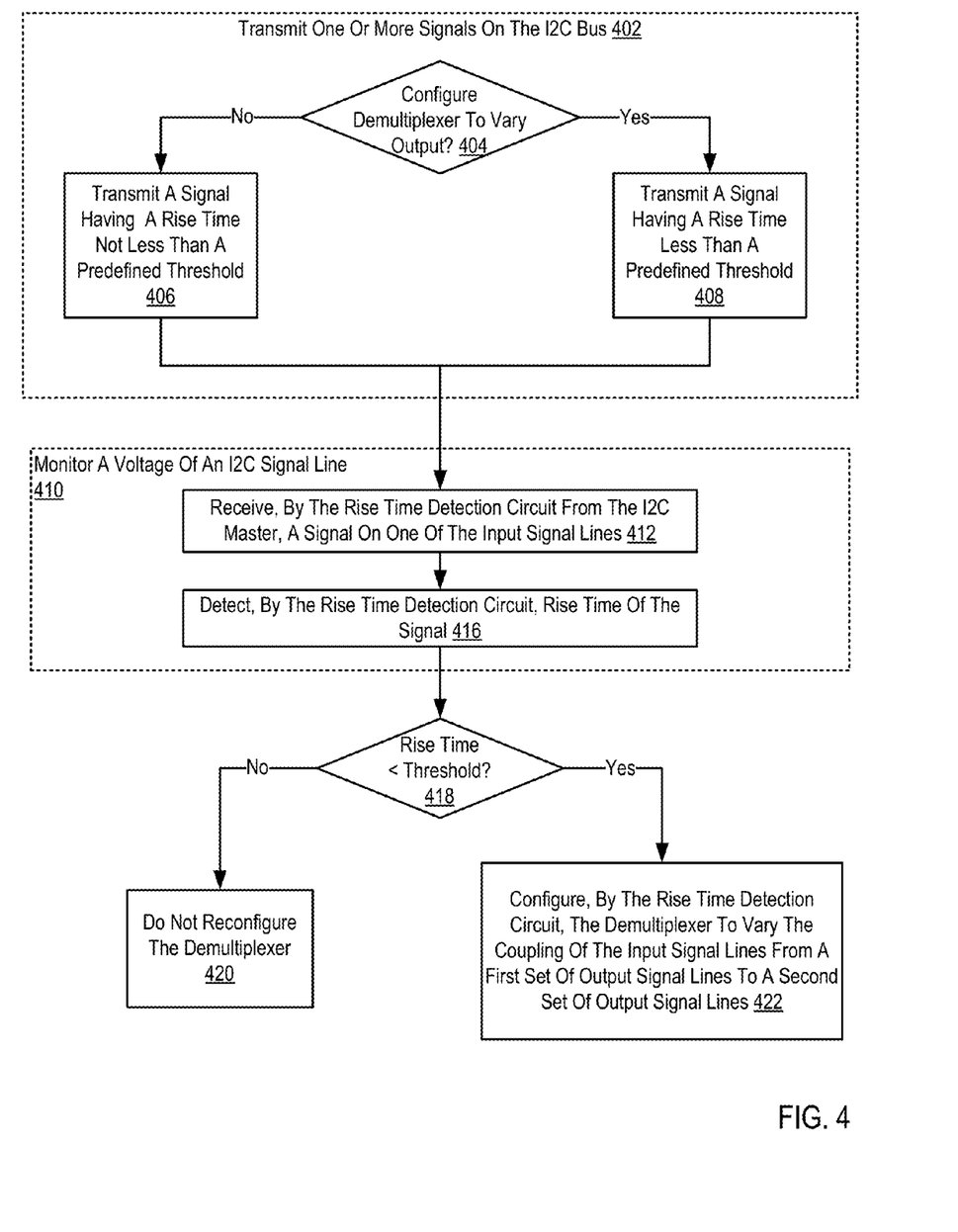
FIG. 4 sets forth a flow chart illustrating an exemplary method for operating a demultiplexer on an I²C bus according to embodiments of the present invention.

For further explanation, FIG. 4 sets forth a flow chart illustrating an exemplary method for operating a demultiplexer on an I²C bus according to embodiments of the present invention. The method of FIG. 4 is carried out in a system similar to that of FIG. 2 that includes a demultiplexer (126) with a plurality of input signal lines (204, 206), and a plurality of sets of output signal lines coupled to I²C slave devices. The demultiplexer (126) is configured to couple the input signal lines among the sets of output signal lines in dependence upon a demultiplexer select signal line (114). The demultiplexer select signal line (114) couples a rise time detection circuit (102) to the demultiplexer (126). The rise time detection circuit (102) is also coupled to the input signal lines (204, 206) from the I²C master.

The method of FIG. 4 includes transmitting (402), by the I²C master, one or more signals on the I²C bus including determining (404), by the I²C master, whether to configure the demultiplexer to vary the coupling of input signal lines from a first set of output signal lines to a second set of output signal lines.

Determining (404) whether to configure the demultiplexer to vary the coupling of input signal lines from a first set of output signal lines to a second set of output signal lines may be carried out by determining the destination device of the data to be transmitted on the I²C bus. If the data is to be transmitted to a destination device not currently receiving data via the demultiplexer, the I²C master may reconfigure the demultiplexer to vary the coupling of the input signal lines (such as the SDL and SCL) from a first set of output signal lines to the set of output signals connected to the destination device.

If the I²C master determines to configure the demultiplexer to vary the coupling, the method of FIG. 4 continues by transmitting (408), by the I²C master to the rise time detection circuit and the demultiplexer, a signal on one of the input signal lines, including driving the signal to a logic high with an active driver, thereby causing the signal to have a rise time less than a predefined threshold. Driving the signal to a logic high with an active driver may be carried out by an active, tri-state buffer or driver, rather than passively, with a pull-up resistor on the signal line.

In some embodiments, the I²C master is configured to drive a signal on the SCL high with an active driver. That is, in some embodiments, transmitting (408) a signal on one of the input signal lines, including driving the signal to a logic high with an active driver, thereby causing the signal to have a rise time less than a predefined threshold may be carried out by transmitting an SCL signal on the SCL, including driving the SCL signal to a logic high with an active driver, thereby causing the SCL signal to have a rise time less than the predefined threshold. Driving the SCL signal to a logic high with an active driver may be carried out in some embodiments only on a first clock edge after issuing a start bit. A start bit in I²C is an indication from a I²C master to an I²C slave that a data transmission is beginning. The master initially sends the start bit followed by a 7-bit address of the slave, which is then followed by a single bit representing whether the data transmission is a write to or a read from the slave. The start bit is generally indicated by a high-to-low transition of SDA with SCL high.

If the I²C master determines not to configure the demultiplexer to vary the coupling, the method of FIG. 4 continues by transmitting (406), by the I²C master to the rise time detection circuit and the demultiplexer, a signal on one of the input signal lines, including driving the signal to a logic high passively thereby causing the signal to have a rise time not less than the predefined threshold. Transmitting (406) a signal having a rise time not less than the predefined threshold may be carried out by transmitting an SCL signal on the SCL, driving the SCL signal to a logic high passively, thereby causing the SCL signal to have a rise time not less than a predefined threshold. Driving the SCL signal—or any signal—to a logic high passively may be carried out with a pull-up resistor on a signal line.

The method of FIG. 4 also includes monitoring (410), by the rise time detection circuit, a voltage of at least one of the input signal lines, where the voltage alternates between a logic low voltage and a logic high voltage. In the method of FIG. 4, monitoring (410) the voltage of at least one of the input signal lines—say the SCL—includes receiving (412), by the rise time detection circuit from the I²C master, a signal on one of the input signal lines and detecting (416), by the rise time detection circuit, rise time of the signal.

Detecting (416), by the rise time detection circuit, rise time of the signal may be carried out by detecting a first voltage on the signal line, the first voltage being greater than the logic low voltage; starting, responsive to the detection of the first voltage, an automatically incrementing counter, the counter incrementing once for each clock period of the rise time detection circuit; detecting a second voltage on the signal line, the second voltage greater than the first voltage and less than the logic high voltage; stopping, responsive to the detection of the second voltage, the automatically incrementing counter; and calculating, in dependence upon the clock period of the rise time detection circuit and the value of the counter, a rise time for the signal line.

If the rise time of the signal is not less than a predefined threshold, the method of FIG. 4 continues by not reconfiguring the demultiplexer. If, however, the rise time of the signal is less than the predefined threshold, the method of FIG. 4 continues by configuring (422), by the rise time detection circuit, the demultiplexer to vary the coupling of the input signal lines from a first set of output signal lines to a second set of output signal lines. In this way, configuring (422) the demultiplexer to vary the coupling of the input signal lines from a first set of output signal lines to a second set of output signal lines includes configuring the demultiplexer without utilizing a unique I²C address for the demultiplexer As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operating a demultiplexer on an Inter-Integrated Circuit ('I$^2$C') bus, the demultiplexer comprising a set of input signal lines from an I$^2$C master and a plurality of sets of output signal lines, the demultiplexer configured to couple the input signal lines among the sets of output signal lines in dependence upon a demultiplexer select signal line, the demultiplexer select signal line coupling the demultiplexer to a rise time detection circuit, the rise time detection circuit also coupled to the input signal lines from the I$^2$C master, the method comprising:
    monitoring, by the rise time detection circuit, a voltage of at least one of the input signal lines, the voltage alternating between a logic low voltage and a logic high voltage, including:
        receiving, by the rise time detection circuit from the I$^2$C master, a signal on one of the input signal lines; and
        detecting, by the rise time detection circuit, rise time of the signal; and
    if the rise time of the signal is less than a predefined threshold, configuring, by the rise time detection circuit, the demultiplexer to vary the coupling of the input signal lines from a first set of output signal lines to a second set of output signal lines.

2. The method of claim 1 wherein:
    the set of input signal lines comprises a Serial Data Line ('SDL') and a Serial Clock Line ('SCL');
    receiving a signal on one of the input signal lines further comprises receiving an SCL signal on the SCL; and
    configuring the demultiplexer to vary the coupling of the input signal lines from a first set of output signal lines to a second set of output signal lines, further comprises configuring the demultiplexer to vary the coupling of the SDL and SCL from a first set of output signal lines to a second set of output signal lines.

3. The method of claim 1 wherein detecting, by the rise time detection circuit, rise time of the signal further comprises:
    detecting a first voltage on the signal line, the first voltage being greater than the logic low voltage;
    starting, responsive to the detection of the first voltage, an automatically incrementing counter, the counter incrementing once for each clock period of the rise time detection circuit;
    detecting a second voltage on the signal line, the second voltage greater than the first voltage and less than the logic high voltage;
    stopping, responsive to the detection of the second voltage, the automatically incrementing counter; and
    calculating, in dependence upon the clock period of the rise time detection circuit and the value of the counter, a rise time for the signal line.

4. The method of claim 1 wherein:
    the rise time of the signal is less than a predefined threshold responsive to the I$^2$C master driving the signal to a logic high with an active driver; and the rise time of the signal is not less than a predefined threshold responsive to the I²C master driving the signal to a logic high passively.

5. The method of claim 1 wherein configuring the demultiplexer to vary the coupling of the input signal lines from a first set of output signal lines to a second set of output signal lines further comprises configuring the demultiplexer without utilizing a unique I²C address for the demultiplexer.

6. A rise time detection circuit for operating a demultiplexer on an Inter-Integrated Circuit ('I²C') bus, the demultiplexer comprising a set of input signal lines from an I²C master and a plurality of sets of output signal lines, the demultiplexer configured to couple the input signal lines among the sets of output signal lines in dependence upon a demultiplexer select signal line, the demultiplexer select signal line coupling the demultiplexer to the rise time detection circuit, the rise time detection circuit also coupled to the input signal lines from the I²C master, the rise time detection circuit configured to carry out the steps of:
   monitoring, by the rise time detection circuit, a voltage of at least one of the input signal lines, the voltage alternating between a logic low voltage and a logic high voltage, including:
      receiving, by the rise time detection circuit from the I²C master, a signal on one of the input signal lines; and
      detecting, by the rise time detection circuit, rise time of the signal; and
   if the rise time of the signal is less than a predefined threshold, configuring, by the rise time detection circuit, the demultiplexer to vary the coupling of the input signal lines from a first set of output signal lines to a second set of output signal lines.

7. The apparatus of claim 6 wherein:
the set of input signal lines comprises a Serial Data Line ('SDL') and a Serial Clock Line ('SCL');
receiving a signal on one of the input signal lines further comprises receiving an SCL signal on the SCL; and
configuring the demultiplexer to vary the coupling of the input signal lines from a first set of output signal lines to a second set of output signal lines, further comprises configuring the demultiplexer to vary the coupling of the SDL and SCL from a first set of output signal lines to a second set of output signal lines.

8. The apparatus of claim 6 wherein detecting, by the rise time detection circuit, rise time of the signal further comprises:
detecting a first voltage on the signal line, the first voltage being greater than the logic low voltage;
starting, responsive to the detection of the first voltage, an automatically incrementing counter, the counter incrementing once for each clock period of the rise time detection circuit;
detecting a second voltage on the signal line, the second voltage greater than the first voltage and less than the logic high voltage;
stopping, responsive to the detection of the second voltage, the automatically incrementing counter; and
calculating, in dependence upon the clock period of the rise time detection circuit and the value of the counter, a rise time for the signal line.

9. The apparatus of claim 6 wherein:
the rise time of the signal is less than a predefined threshold responsive to the I²C master driving the signal to a logic high with an active driver; and
the rise time of the signal is not less than a predefined threshold responsive to the I²C master driving the signal to a logic high passively.

10. The apparatus of claim 6 wherein configuring the demultiplexer to vary the coupling of the input signal lines from a first set of output signal lines to a second set of output signal lines further comprises configuring the demultiplexer without utilizing a unique I²C address for the demultiplexer.

11. A method of operating a demultiplexer on an Inter-Integrated Circuit ('I²C') bus, the demultiplexer comprising a set of input signal lines from an I²C master, the demultiplexer further comprising a plurality of sets of output signal lines, the demultiplexer configured to couple the input signal lines among the sets of output signal lines in dependence upon a demultiplexer select signal line, the demultiplexer select signal line coupling the demultiplexer to a rise time detection circuit, the rise time detection circuit also coupled to the input signal lines from the I²C master, the method comprising:
   determining, by the I²C master, whether to configure the demultiplexer to vary the coupling of input signal lines from a first set of output signal lines to a second set of output signal lines;
   if the I²C master determines to configure the demultiplexer to vary the coupling: transmitting, by the I²C master to the rise time detection circuit and the demultiplexer, a signal on one of the input signal lines, including driving the signal to a logic high with an active driver, the signal comprising a rise time less than a predefined threshold; and
   if the I²C master determines not to configure the demultiplexer to vary the coupling: transmitting, by the I²C master to the rise time detection circuit and the demultiplexer, a signal on one of the input signal lines, including driving the signal to a logic high passively, the signal comprising a rise time not less than the predefined threshold,
   wherein the rise time detection circuit is configured to: receive the signal, detect rise time of the signal, and configure the demultiplexer to vary the coupling of the input signal lines from a first set of output signal lines to a second set of output signal lines, via the demultiplexer select signal line, if the rise time of the signal is less than the predefined threshold.

12. The method of claim 11 wherein:
the set of input signal lines comprises a Serial Data Line ('SDL') and a Serial Clock Line ('SCL');
determining whether to configure the demultiplexer to vary the coupling of input signal lines from a first set of output signal lines to a second set of output signal lines further comprises determining whether to configure the demultiplexer to vary the coupling of SDL and SCL from a first set of output signal lines to a second set of output signal lines;
transmitting a signal on one of the input signal lines, including driving the signal to a logic high with an active driver, the signal comprising a rise time less than a predefined threshold further comprises transmitting an SCL signal on the SCL, including driving the SCL signal to a logic high with an active driver, the SCL signal comprising a rise time less than a predefined threshold; and
transmitting a signal on one of the input signal lines, including driving the signal to a logic high passively, the signal comprising a rise time not less than a predefined threshold further comprises transmitting an SCL signal on the SCL, including driving the SCL signal to a logic high passively, the SCL signal comprising a rise time not less than a predefined threshold.

13. The method of claim 12 wherein transmitting an SCL signal on the SCL, including driving the SCL signal to a logic high with an active driver, the SCL signal comprising a rise time less than a predefined threshold further comprises driving the SCL signal to a logic high with an active driver only on a first clock edge after issuing a start bit.

14. The method of claim 11 wherein transmitting, to the rise time detection circuit and the demultiplexer, a signal on one of the input signal lines, including driving the signal to a logic high with an active driver, the signal comprising a rise time less than a predefined threshold further comprises configuring the demultiplexer to vary the coupling of input signal lines from a first set of output signal lines to a second set of output signal lines without utilizing a unique $I^2C$ address for the demultiplexer.

15. An apparatus for operating a demultiplexer on an Inter-Integrated Circuit ('$I^2C$') bus, the demultiplexer comprising a set of input signal lines from an $I^2C$ master, the demultiplexer further comprising a plurality of sets of output signal lines, the demultiplexer configured to couple the input signal lines among the sets of output signal lines in dependence upon a demultiplexer select signal line, the demultiplexer select signal line coupling the demultiplexer to a rise time detection circuit, the rise time detection circuit also coupled to the input signal lines from the $I^2C$ master, the apparatus comprising a computer processor, a computer memory operatively coupled to the computer processor, the computer memory having disposed within it computer program instructions that, when executed by the computer processor, cause the apparatus to carry out the steps of:
- determining, by the $I^2C$ master, whether to configure the demultiplexer to vary the coupling of input signal lines from a first set of output signal lines to a second set of output signal lines;
- if the $I^2C$ master determines to configure the demultiplexer to vary the coupling: transmitting, by the $I^2C$ master to the rise time detection circuit and the demultiplexer, a signal on one of the input signal lines, including driving the signal to a logic high with an active driver, the signal comprising a rise time less than a predefined threshold; and
- if the $I^2C$ master determines not to configure the demultiplexer to vary the coupling: transmitting, by the $I^2C$ master to the rise time detection circuit and the demultiplexer, a signal on one of the input signal lines, including driving the signal to a logic high passively, the signal comprising a rise time not less than a predefined threshold,
- wherein the rise time detection circuit is configured to: receive the signal, detect rise time of the signal, and configure the demultiplexer to vary the coupling of the input signal lines from a first set of output signal lines to a second set of output signal lines, via the demultiplexer select signal line, if the rise time of the signal is less than the predefined threshold.

16. The apparatus of claim 15 wherein:
- the set of input signal lines comprises a Serial Data Line ('SDL') and a Serial Clock Line ('SCL');
- determining whether to configure the demultiplexer to vary the coupling of input signal lines from a first set of output signal lines to a second set of output signal lines further comprises determining whether to configure the demultiplexer to vary the coupling of SDL and SCL from a first set of output signal lines to a second set of output signal lines;
- transmitting a signal on one of the input signal lines, including driving the signal to a logic high with an active driver, the signal comprising a rise time less than a predefined threshold further comprises transmitting an SCL signal on the SCL, including driving the SCL signal to a logic high with an active driver, the SCL signal comprising a rise time less than a predefined threshold; and
- transmitting a signal on one of the input signal lines, including driving the signal to a logic high passively, the signal comprising a rise time not less than a predefined threshold further comprises transmitting an SCL signal on the SCL, including driving the SCL signal to a logic high passively, the SCL signal comprising a rise time not less than a predefined threshold.

17. The apparatus of claim 16 wherein transmitting an SCL signal on the SCL, including driving the SCL signal to a logic high with an active driver, the SCL signal comprising a rise time less than a predefined threshold further comprises driving the SCL signal to a logic high with an active driver only on a first clock edge after issuing a start bit.

18. The apparatus of claim 15 wherein transmitting, to the rise time detection circuit and the demultiplexer, a signal on one of the input signal lines, including driving the signal to a logic high with an active driver, the signal comprising a rise time less than a predefined threshold further comprises configuring the demultiplexer to vary the coupling of input signal lines from a first set of output signal lines to a second set of output signal lines without utilizing a unique $I^2C$ address for the demultiplexer.

19. A computer program product for operating a demultiplexer on an Inter-Integrated Circuit ('$I^2C$') bus, the demultiplexer comprising a set of input signal lines from an $I^2C$ master, the demultiplexer further comprising a plurality of sets of output signal lines, the demultiplexer configured to couple the input signal lines among the sets of output signal lines in dependence upon a demultiplexer select signal line, the demultiplexer select signal line coupling the demultiplexer to a rise time detection circuit, the rise time detection circuit also coupled to the input signal lines from the $I^2C$ master, the computer program product disposed upon a computer readable medium, the computer program product comprising computer program instructions that, when executed, cause a computer to carry out the steps of:
- determining, by the $I^2C$ master, whether to configure the demultiplexer to vary the coupling of input signal lines from a first set of output signal lines to a second set of output signal lines;
- if the $I^2C$ master determines to configure the demultiplexer to vary the coupling: transmitting, by the $I^2C$ master to the rise time detection circuit and the demultiplexer, a signal on one of the input signal lines, including driving the signal to a logic high with an active driver, the signal comprising a rise time less than a predefined threshold; and
- if the $I^2C$ master determines not to configure the demultiplexer to vary the coupling: transmitting, by the $I^2C$ master to the rise time detection circuit and the demultiplexer, a signal on one of the input signal lines, including driving the signal to a logic high passively, the signal comprising a rise time not less than the predefined threshold,
- wherein the rise time detection circuit is configured to: receive the signal, detect rise time of the signal, and configure the demultiplexer to vary the coupling of the input signal lines from a first set of output signal lines to a second set of output signal lines, via the demultiplexer select signal line, if the rise time of the signal is less than the predefined threshold.

* * * * *